United States Patent [19]
Mizoguchi

[11] Patent Number: 5,927,913
[45] Date of Patent: Jul. 27, 1999

[54] TOOL HOLDER

[75] Inventor: Haruki Mizoguchi, Ikoma, Japan

[73] Assignee: MST Corporation, Ikoma, Japan

[21] Appl. No.: 09/114,907

[22] Filed: Jul. 14, 1998

[30] Foreign Application Priority Data

Jul. 29, 1997 [JP] Japan ................................. 9-203554

[51] Int. Cl.⁶ ................................................ B23B 31/02
[52] U.S. Cl. .............................. 408/238; 279/8; 279/53; 408/226; 408/240
[58] Field of Search .................... 408/226, 238, 408/239 R, 240; 279/8, 53, 42, 51

[56] References Cited

U.S. PATENT DOCUMENTS

| | | | |
|---|---|---|---|
| 2,311,258 | 2/1943 | Sjogren | 279/53 |
| 3,030,119 | 1/1961 | Myers | 279/53 |
| 4,122,755 | 10/1978 | Johnson et al. | 408/238 |
| 5,002,442 | 3/1991 | Rutschle | 408/238 |

FOREIGN PATENT DOCUMENTS

| | | |
|---|---|---|
| 60-94206 | 5/1988 | Japan . |
| 8-90318 | 4/1996 | Japan . |
| 8-150504 | 6/1996 | Japan . |

Primary Examiner—Andrea L. Pitts
Assistant Examiner—Monica Smith
Attorney, Agent, or Firm—Burns, Doane, Swecker & Mathis, LLP

[57] ABSTRACT

A tool holder having a holder body, a collet, an intermediate rod, a clamp bolt and a pull stud. The collet and the intermediate rod are integrally connected by screwing. The collet is retracted into the holder body via the intermediate rod by rotating the clamp bolt in the first direction, and presses and holds a cutting tool. In this event, a head of the clamp bolt comes in pressure-contact with a stepped surface of the holder body by surface friction and rotates. On the other hand, in order to release the cutting tool, the clamp bolt is rotated in the second direction opposite to the first direction. In this event, the clamp bolt is rotated by rolling friction via steel balls inserted between the head and a center hole of the holder body, and the collet is pressed out forward.

10 Claims, 5 Drawing Sheets

TOOL HOLDER

BACKGROUND OF THE INVENTION

1. Field of the Invention

The present invention relates to a tool holder, and more specifically, to a tool holder for mounting a cutting tool such as drills, end mills, etc. to a main spindle of a machine tool.

2. Description of Prior Art

Hitherto, a tool holder as shown in FIG. 5 has been offered. This tool holder is configured as a retracting type, and comprises a main body 1, a spring collet 10, an intermediate rod 15, a clamp bolt 20 and a pull stud 30. At the axial center portion of the main body 1, a center hole 4 that passes through the main body 1 from the top end to the rear end is formed. The collet 10 is mounted to the front tapered hole portion 4a of the center hole 4 and pressure-holds a shank portion 40a of the cutting tool 40 by being pulled to the rear side (in the arrow "A" direction). The front portion of the rod 15 is connected to the rear portion of the collet 10, and to the rear portion, the clamp bolt 20 is screwed.

In this tool holder, rotating the clamp bolt 20 in the arrow "a" direction (forward direction) retracts the collet 10 via the rod 15 and gives the collet 10 a tightening force to the cutting tool 40. In order to remove the tool 40, the clamp bolt 20 is rotated in the opposite direction to arrow "a", which cancels the tightening force of the collet 10. To rotate the clamp bolt 20, the pull stud 30 is removed and a hex key (not illustrated) is fitted to a hexagon hole 22 of the bolt head 21, or the pull stud 30 is kept mounted and the hex key is inserted in the through hole 31 to be fitted to the hexagon hole 22.

Now, in the tool holder comprising as above, the torque for rotating the clamp bolt 20 in the reverse direction to untighten the tool (to push out the collet) is larger than the torque for rotating the clamp bolt 20 in the forward direction to tighten the tool (to retract the collet). This is because biting phenomena occur between the collet tapered portion 10a and the main body tapered hole portion 4a when the collet 10 is retracted by rotating the clamp bolt 20 in the forward direction.

Consequently, even rotating the clamp bolt 20 in the reverse direction to remove the tool is unable to release the connection between the tapered portion 10a and the tapered hole portion 4a, and to release this connection, an impact must be given to the head 21 of the clamp bolt 20 from the rear to tap out the collet 10. However, this has a problem of poor operability.

Therefore, there has been proposed a method wherein the tip end surface 30a of the pull stud 30 is located adjacent to the head 21 of the clamp bolt 20, and a hex key is inserted in the through hole 31 with the pull stud 30 mounted to the main body 1 to rotate the clamp bolt 20 in the reverse direction (see Japanese Laid Open Patent Publication No. 8-150504). In this method, rotating the clamp bolt 20 in the reverse direction causes the head to come in pressure-contact with the tip-end surface 30a of the pull stud 30 and presses forward the collet 10, and releases the connection between the tapered portion 10a and tapered hole portion 4a.

However, in this method, at the time of untightening the collet 10, the head portion 21 comes in pressure-contact with the pull stud tip end surface 30a by surface friction, requiring a very large torque to rotate the clamp bolt 20 in the reverse direction and creating a problem of difficult operation.

SUMMARY OF THE INVENTION

It is an object of the present invention to provide a tool holder which is easy to cancel the tightening force to the cutting tool.

In order to achieve the above object, a tool holder according to the present invention, comprising a holder body which has, on its rear portion, a tapered shank portion to be mounted to a main spindle of a machine tool, a collet mounted in a tapered hole portion formed on a front portion of the holder body and pulled backward for generating a force to hold a cutting tool, a clamp bolt inserted into a center hole of the holder body from the rear while being connected to the collet and rotated in a first (forward) direction for imparting a tightening force to the collet and in a second (reverse) direction for canceling the collet tightening force, wherein a head of the clamp bolt comes in pressure-contact with an inner surface of the holder body by surface friction at the time of rotating in the first direction and by rolling friction at the time of rotating in the second direction.

In the present invention, in order to cancel the collet tightening force, the clamp bolt is rotated in the second direction, thereby causing the clamp bolt head to come in pressure-contact with the inner surface of the holder body by rolling friction, and the collet is pressed forward. The rolling friction has marked smaller friction resistance than surface friction, and is able to rotate the clamp bolt in the second direction with a small torque.

Consequently, according to the present invention, only a small torque is required for rotating the clamp bolt in the second direction when the cutting tool is removed, and the collet is able to be pressed out to cancel the tightening force only by rotation without striking out the clamp bolt, achieving good operability.

In addition, the tool holder according to the present invention can provide the same operational effects as described above even if the holder body does not use a collet but has a tapered hole portion on the front, to which a tapered shank portion of a cutting tool is inserted. In the tool holder of this configuration, the clamp bolt should be directly screwed down to the rear portion of the cutting tool or connected to the cutting tool via a rod.

BRIEF DESCRIPTION OF THE DRAWINGS

This and other objects and features of the present invention will become apparent from the following description with reference to the accompanying drawings, in which.

DETAILED DESCRIPTION OF THE PREFERRED EMBODIMENTS

Figure 1:
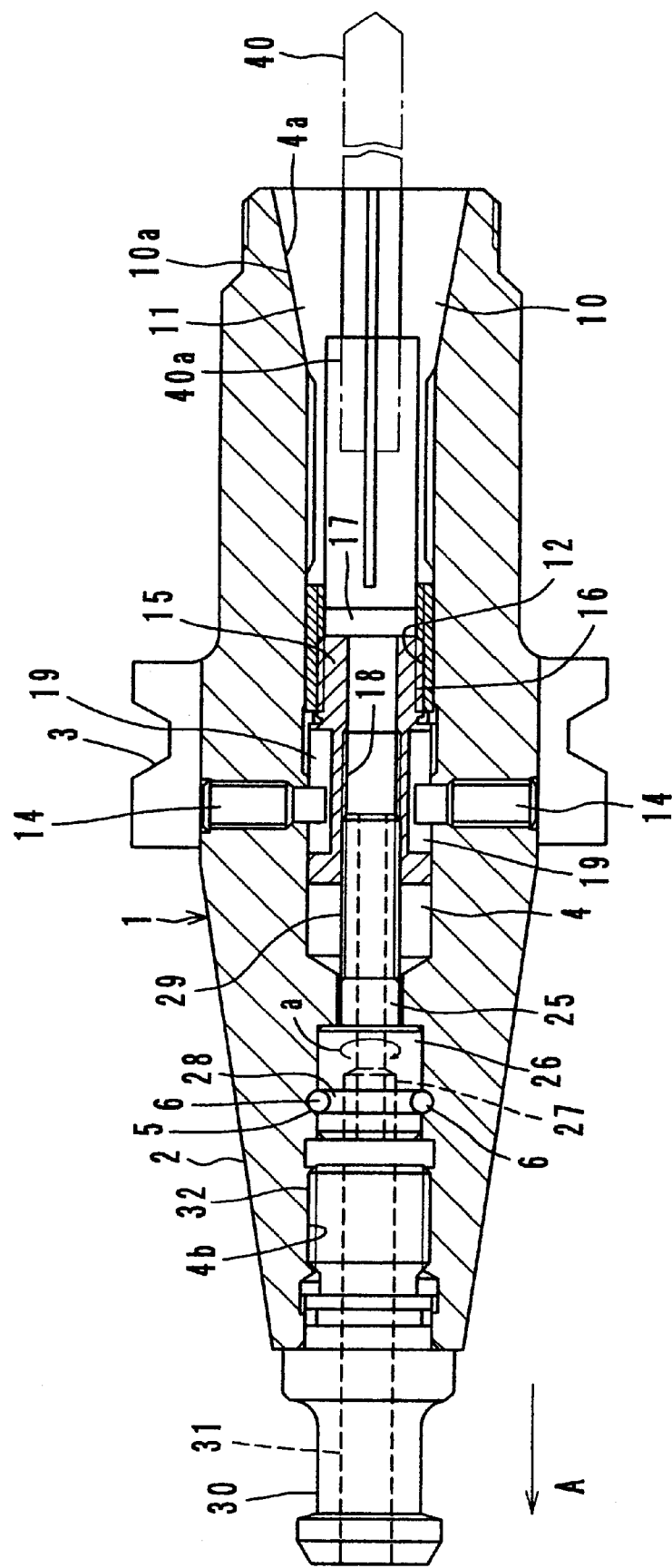
FIG. 1 is a cross-sectional view showing a tool holder of the first embodiment according to the present invention.

Referring now to the drawings, preferred embodiments according to the present invention will be described in detail hereinafter.

(First Embodiment: See FIGS. 1 and 2.)

Figure 2:
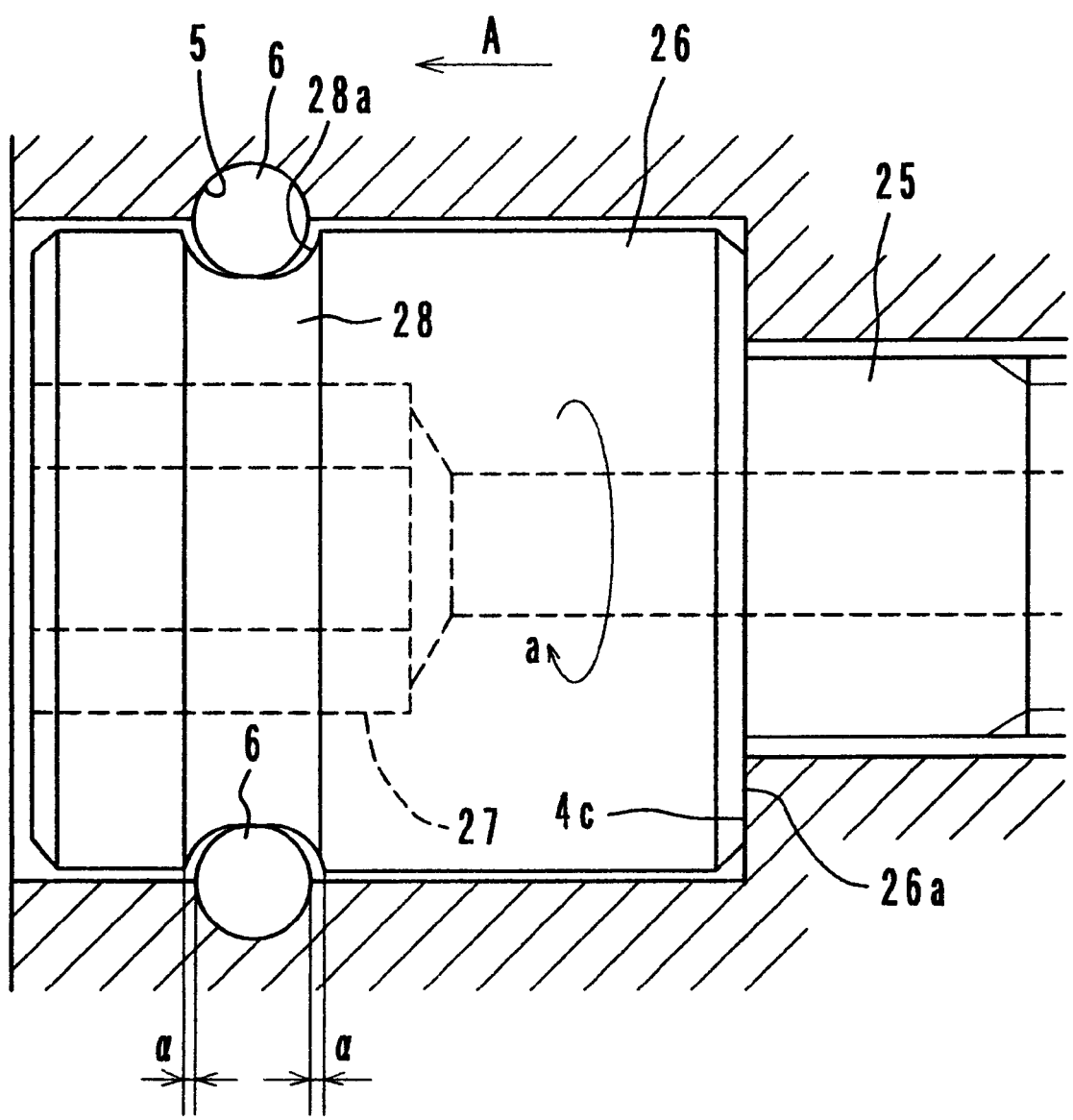
FIG. 2 is an enlarged cross-sectional view showing the essential part of the tool holder.

In FIG. 1, the tool holder of the first embodiment according to the present invention comprises a holder body 1, a spring collet 10, an intermediate rod 15, a clamp bolt 25, and a pull stud 30.

The holder body 1 has a tapered shank portion 2 to be inserted in the main spindle of a machine tool on the rear portion in the arrow "A" direction, a manipulator holding portion 3 at the intermediate portion, and has a center hole 4 which passes through the body 1 horizontally. On the inner circumferential surface of the front portion, a tapered hole portion 4a is formed.

The spring collet 10 has a split claw portion 11 with a tapered portion 10a and a threaded portion 12, and is inserted into the center hole 4 of the holder body 1 from the front. Allowing the tapered portion 10a to come in pressure-contact with the tapered hole portion 4a of the holder body 1 bends the split claw portion 11 inwards and holds the shank portion 40a of a cutting tool 40. The intermediate rod 15 has a threaded portion 16 on the front outer circumferential surface, a threaded portion 18 on the rear portion of a center hole 17 and a groove 19 extending in the axial direction on the outer circumferential surface. This intermediate rod 15 is integrally connected to the collet 10 by screwing the threaded portion 16 to the threaded portion 12 of the collet 10, and is inserted in the center hole 4 of the holder body 1. By engaging the tip end of the guide screw 14 screwed down from the outer circumferential surface of the holder body 1 with the groove 19, the intermediate rod 15 is set to the state in which the rod 15 can move in the axial direction but does not rotate.

The clamp bolt 25 has a head 26 and a threaded portion 29, and is inserted into the center hole 4 of the holder body 1 from the rear and has a threaded portion 29 screwed down to the threaded portion 18 of the intermediate rod 15. At the head 26, a hexagonal hole 27 is formed, and on the outer circumferential surface, a ring groove 28 with a nearly semi-circular cross section is formed. On the other hand, to the center hole 4 of the holder body 1, a ring groove 5 with a semi-circular cross section is formed at the position opposite to the groove 28, and in the grooves 5 and 28, a plurality of steel balls 6 are mounted. In order to mount the steel balls 6, holes (not illustrated) which extend from the groove 5 to the outer circumferential surface are made in the holder body 1, and after inserting the clamp bolt 25 into the center hole 4, steel balls 6 are mounted to the grooves 5 and 28 through the holes. The holes are stopped up by screwing down a pin (not illustrated) after mounting the steel balls 6.

The pull stud 30 has a through hole 31 and has a tip-end threaded portion 32 screwed down to the threaded portion 4b formed on the rear portion of the center hole 4 of the holder body 1. This pull stud 30 is retracted by a clamp mechanism inside the main spindle when the holder body 1 is inserted into the main spindle of the machine tool. With this operation, the tapered shank portion 2 is pressed against the tapered hole portion of the main spindle.

In the tool holder with the foregoing configuration, the cutting tool 40 is mounted and removed as follows.

First of all, the shank portion 40a of the cutting tool 40 is inserted into the collet 10 by a specified amount, and using a hex key, the clamp bolt 25 is rotated in the arrow "a" direction. More specifically, the pull stud 30 is removed, or if the pull stud 30 is kept mounted, the hex key is inserted in the through hole 31, and the tip end of the hex key is fitted into the hexagonal hole 27 of the clamp bolt 25. In this event, the front surface 26a of the head 26 is in pressure-contact with the stepped surface 4c formed on the center hole 4 by surface friction (see FIG. 2), and the collet 10 is pulled backward via the intermediate rod 15. With this operation, the tapered portion 10a of the collet 10 is pressed against the tapered hole portion 4a of the holder body 1, and the split crawl portion 11 tightens and holds the shank portion 40a of the cutting tool 40. In this event, between the steel balls 6 and the groove 28, a clearance α exists (see FIG. 2), and the friction resistance of the steel balls 6 is insignificant.

On the other hand, when the cutting tool 40 is removed, using a hex key as in the case of tightening, the clamp bolt 25 is rotated in the direction opposite to the arrow "a". In this kind of tool holder, as described above, when the collet 10 is retracted, biting phenomena occur between the tapered hole portion 4a and the tapered portion 10a, requiring a large torque to separate both. In this first embodiment, when the clamp bolt 25 is rotated in the reverse direction, the bolt 25 tries to move backward (arrow "A" direction), but one side 28a of the groove 28 comes in pressure-contact with the steel balls 6 and the bolt 25 rotates in the reverse direction with the backward travel hindered. With this operation, together with the intermediate rod 15, the collet 10 is pressed forward, and the cutting tool 40 is released from the split crawl portion 11. The steel balls 6 and the grooves 28 and 5 at the time of reverse rotation come in pressure-contact with each other by rolling friction, and the frictional resistance is extremely small. Therefore, the torque for releasing the biting phenomena between the tapered hole portion 4a and the tapered portion 10a is small, compared with the conventional one, the tightening force of the collet 10 can be canceled without releasing the bite by striking the clamp bolt 25, and good operability is achieved.

(Second Embodiment: See FIG. 3.)

Figure 3:
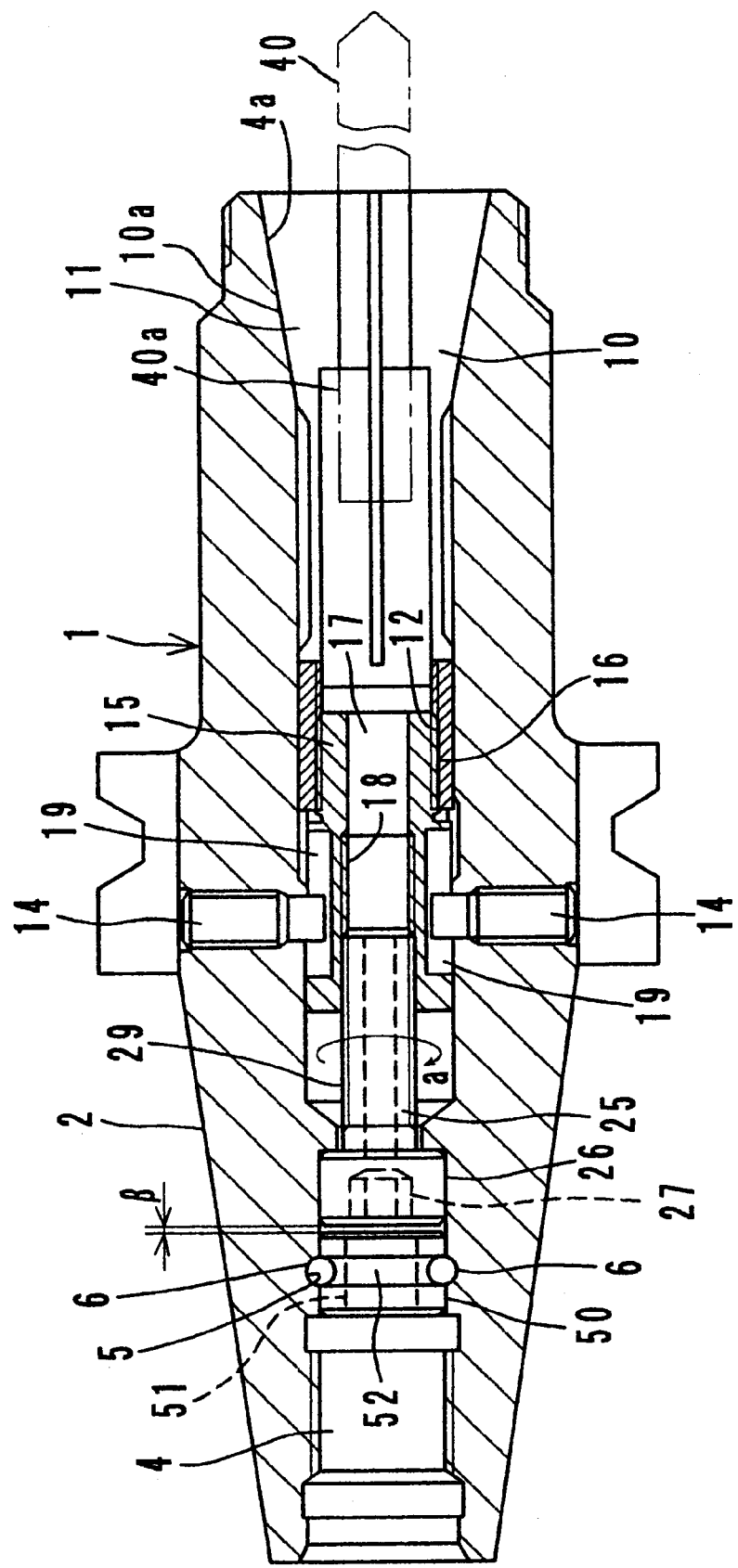
FIG. 3 is a cross-sectional view showing a tool holder of the second embodiment according to the present invention.

The second embodiment has the collar 50 separated from the head 26 of the clamp bolt 25, with other configuration same as that of the first embodiment. In FIG. 3, members similar to those previously described with reference to FIG. 1 are denoted by the same reference numerals, and the explanation is omitted.

The collar 50 has a through hole 51, and on the outer circumferential surface, a ring groove 52 with a semi-circular cross section is formed. The steel balls 6 are inserted between the groove 52 and the ring groove 5 of the holder body 1, and the collar 50 is free to rotate via the steel balls 6 and is not allowed to move in the axial direction.

In this second embodiment, the cutting tool 40 is mounted and removed by fitting the tip end of a hex key to the hexagonal hole 27 of the clamp bolt 25 via the through hole 51 of the collar 50 and rotating the clamp bolt 25 in the forward or reverse direction, which is the same as in the case of the first embodiment. When canceling the tightening force, the clamp bolt 25 moves backward only by a clearance β, the rear end face of the head 26 and the front end face of the collar 50 come in pressure-contact by surface friction, and with this frictional resistance, the collar 50 rotates integrally with the clamp bolt 25. When the collar 50 is integrated with the clamp bolt 25 by surface friction, backward movement of the clamp bolt 25 is hindered, the clamp bolt 25 and the collar 50 roll in the reverse direction integrally with rolling friction of the steel balls 6, thereby pressing out the collet 10 forward, and the tightening force to the cutting tool 40 is canceled.

Figure 4:
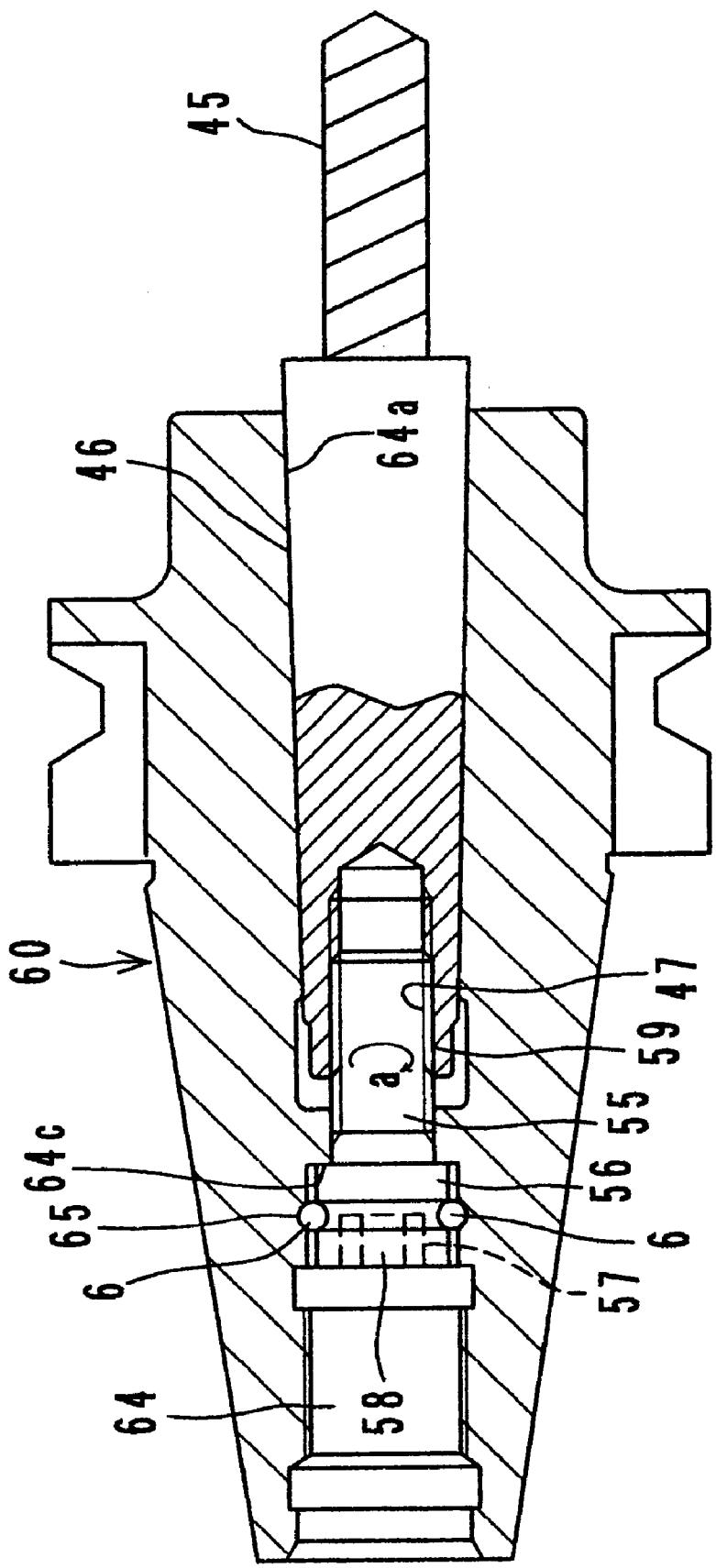
FIG. 4 is a cross-sectional view showing a tool holder of the third embodiment according to the present invention.
Figure 5:
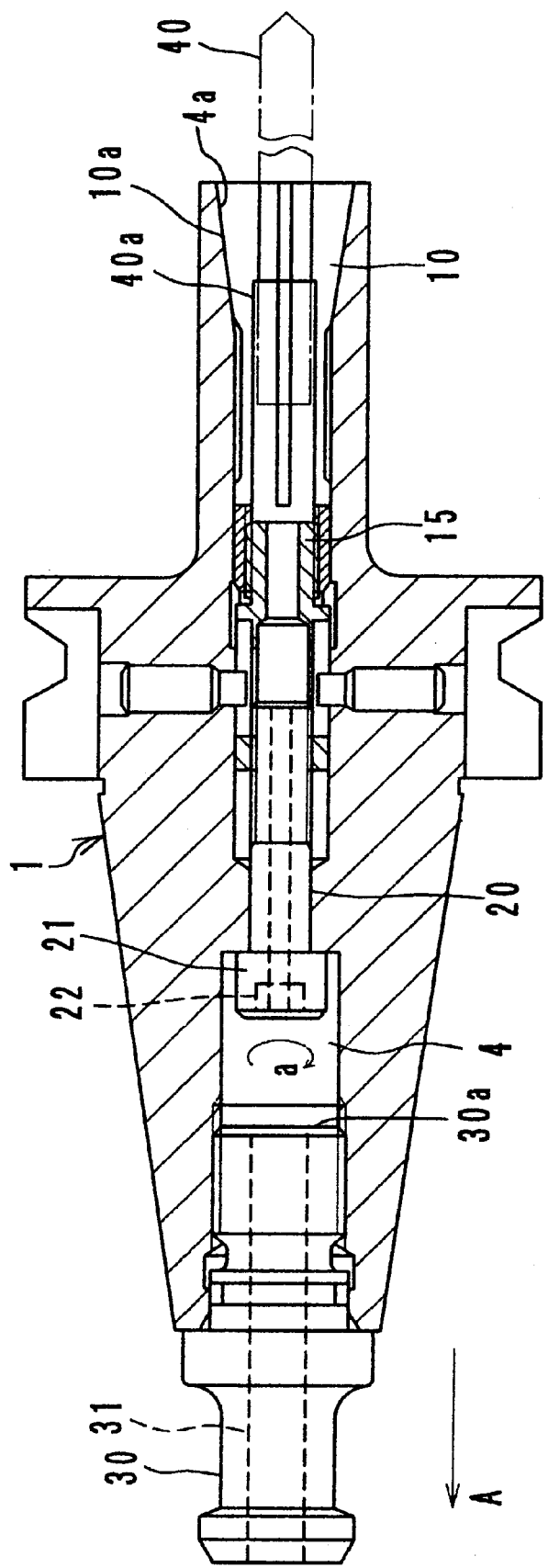
FIG. 5 is a cross-sectional view showing one example of the conventional tool holder.

(Third Embodiment: See FIG. 4.)

The third embodiment is also a retracting type tool holder, but differs from the first and the second embodiments in that a cutting tool 45 is not held with a collet but directly held with the tapered hole portion 64a formed in the center hole 64 of the holder body 60. The cutting tool 45 has a tapered shank portion 46 that fits to the tapered hole portion 64a and has a threaded portion 47 on the rear portion.

The clamp bolt 55 comprises a head 56 with a hexagonal hole 57 and a ring groove 58, and a threaded portion 59 same as the clamp bolt 25 shown in FIG. 1, and the threaded portion 59 is screwed down to the threaded portion 47 of the cutting tool 45. Between the groove 58 and a ring groove 65 formed on the inner circumferential surface of the center hole 64 of the holder body 60, steel balls 6 are mounted.

At the time of tightening, when the clamp bolt 55 is rotated in the forward direction, in the arrow "a" direction, the head 56 comes in pressure-contact with the stepped face 64c formed on the center hole 64 of the holder body 60 by surface friction and when the clamp bolt is rotated in the reverse direction to cancel the tightening force, the head 56 comes in pressure-contact with the groove 65 via the steel balls 6 by rolling friction, which are the same as in the cases of the first and the second embodiments.

In the third embodiment, as shown in the second embodiment, the collar may be separated from the head 56 of the clamp bolt 55. The clamp bolt 55 may be connected to the rear portion of the cutting tool 45 via an intermediate rod.

(Other Embodiments)

Although the present invention has been described in connection with the preferred embodiment, it is to be noted that various changes and modifications are possible to those who are skilled in the art. Such changes and modifications are to be understood as being within the scope of the present invention.

In particular, the configuration of the holder body and the mounting structure to the main spindle, collet form, etc. are optional.

What is claimed is:

1. A tool holder, comprising:

a holder body which has, on its rear portion, a tapered shank portion to be mounted to a main spindle of a machine tool;

a collet mounted in a tapered hole portion formed on a front portion of the holder body and pulled backward for generating a force to hold a cutting tool;

a clamp bolt inserted into a center hole of the holder body from the rear while being connected to the collet and rotated in a first direction for imparting a tightening force to the collet and in a second direction opposite to the first direction for canceling the collet tightening force;

wherein a head of the clamp bolt comes in pressure-contact with an inner surface of the holder body by surface friction at the time of rotating in the first direction and by rolling friction at the time of rotating in the second direction.

2. A tool holder as claimed in claim 1, further comprising a rod which is disposed between the collet and the clamp bolt.

3. A tool holder as claimed in claim 1, wherein the head of the clamp bolt comes in pressure-contact with a stepped surface formed in the center hole of the holder body at the time of rotating in the first direction and comes in pressure-contact with rotatable steel balls mounted in the inner surface of the holder body at the time of rotating in the second direction.

4. A tool holder as claimed in claim 3, wherein the head of the clamp bolt has a separated collar which comes in pressure-contact with the inner surface of the holder body via the steel balls by rolling friction.

5. A tool holder, comprising:

a holder body which has, on its rear portion, a tapered shank portion to be mounted to a main spindle of a machine tool and in a front portion of a center hole, a tapered hole portion to which a tapered shank portion of a cutting tool is inserted;

a clamp bolt inserted into the center hole of the holder body from the rear while being screwed down to a rear portion of the cutting tool and rotated in a first direction for imparting a pressure-contacting force with the tapered shank portion of the cutting tool to the tapered hole portion of the holder body and in a second direction for canceling the pressure-contacting force;

wherein a head of the clamp bolt comes in pressure-contact with an inner surface of the holder body by surface friction at the time of rotating in the first direction and by rolling friction at the time of rotating in the second direction.

6. A tool holder as claimed in claim 5, wherein the head of the clamp bolt comes in pressure-contact with a stepped surface formed in the center hole of the holder body at the time of rotating in the first direction and comes in pressure-contact with rotatable steel balls mounted in the inner surface of the holder body at the time of rotating in the second direction.

7. A tool holder as claimed in claim 6, wherein the head of the clamp bolt has a separated collar which comes in pressure-contact with the inner surface of the holder body via the steel balls by rolling friction.

8. A tool holder, comprising:

a holder body which has, on a rear portion thereof, a tapered shank portion to be mounted to a main spindle of a machine tool;

a collet mounted in a tapered hole portion formed on a front portion of the holder body and pulled backward for generating a force to hold a cutting tool;

a clamp bolt inserted into a center hole of the holder body from the rear while being connected to the collet and rotated in a first direction for imparting a tightening force to the collet and in a second direction opposite to the first direction for canceling the collet tightening force; and means for providing rolling friction disposed between a surface of a head of the clamp bolt and an inner surface of the holder body, said rolling friction providing means is engaged when rotating the clamp bolt in the second direction.

9. The tool holder of claim 8, wherein the surface of the head in contact with the rolling friction providing means is a semi-circular ring groove and the inner surface of the holder body in contact with the rolling friction providing means is a semi-circular ring groove.

10. The tool holder of claim 9, wherein the rolling friction providing means are a plurality of steel balls.

* * * * *